United States Patent [19]
Patrick, II

[11] Patent Number: 5,142,624
[45] Date of Patent: Aug. 25, 1992

[54] VIRTUAL NETWORK FOR PERSONAL COMPUTERS
[75] Inventor: Claude B. Patrick, II, Dallas, Tex.
[73] Assignee: Softworx, Inc., Richardson, Tex.
[21] Appl. No.: 434,015
[22] Filed: Nov. 8, 1989
[51] Int. Cl.⁵ .............................................. G06F 13/38
[52] U.S. Cl. ............................ 395/200; 364/DIG. 1; 364/242.94; 364/284.4; 364/242.6
[58] Field of Search ... 364/200 MS File, 900 MS File; 395/200, 325

[56] References Cited
U.S. PATENT DOCUMENTS

| 4,262,357 | 4/1981 | Shima | 364/200 X |
| 4,470,114 | 9/1984 | Gerhold | 364/200 |
| 4,799,153 | 1/1989 | Hann et al. | 364/200 |
| 4,835,674 | 5/1989 | Collins et al. | 364/200 |

Primary Examiner—Thomas M. Heckler
Attorney, Agent, or Firm—Ross, Howison, Clapp & Korn

[57] ABSTRACT

A network for personal computers includes a network arbiter (10) disposed centrally with respect to a plurality of network stations (12), (14), (16), and (18). Each of the network stations (12-18) includes a personal computer (20), a network peripheral (24) and an interface (22). Each of the interfaces (22) interfaces with the arbiter (10) through a communication link. Each of the network stations has associated therewith a network program (82) that is operable to be executed by a central processing unit (56) in the background to an application program (80). Each of the network programs (82) has associated therewith at the network station a network status memory (86). When information is generated that is to be sent to a network peripheral, an interrupt program (92) interrupts output data from the application program (80) and controls the central processing unit (56) to output the data on a line (94) to the network interface (22). This data is then routed to the arbiter (10) along the line (98).

11 Claims, 4 Drawing Sheets

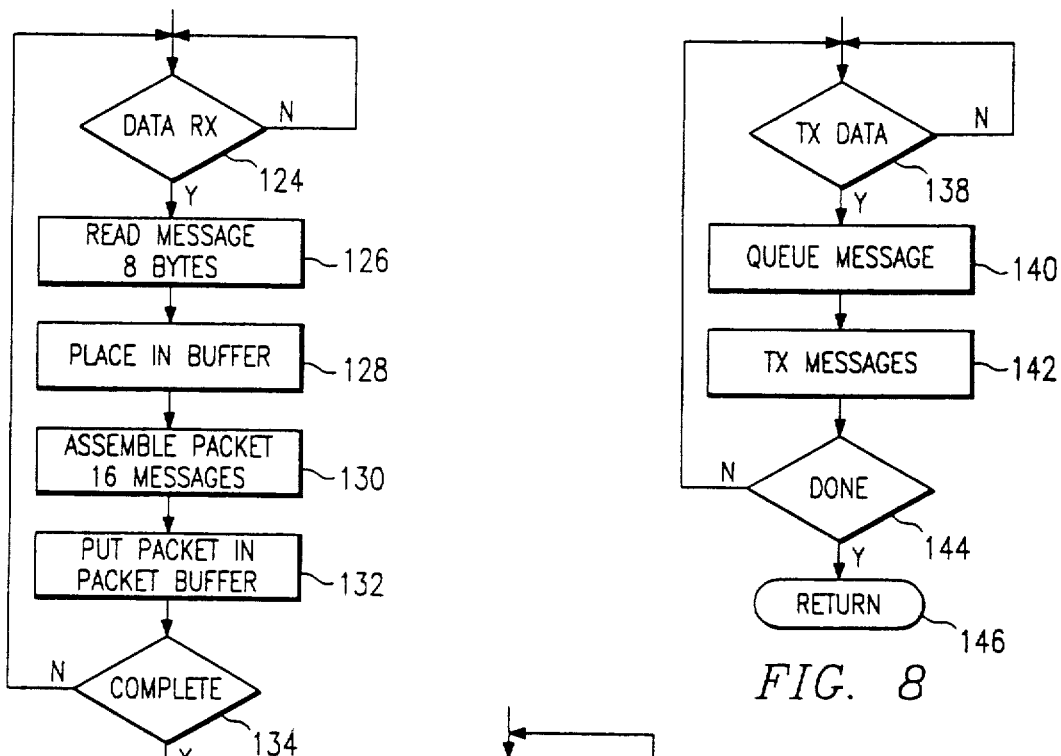
FIG. 7
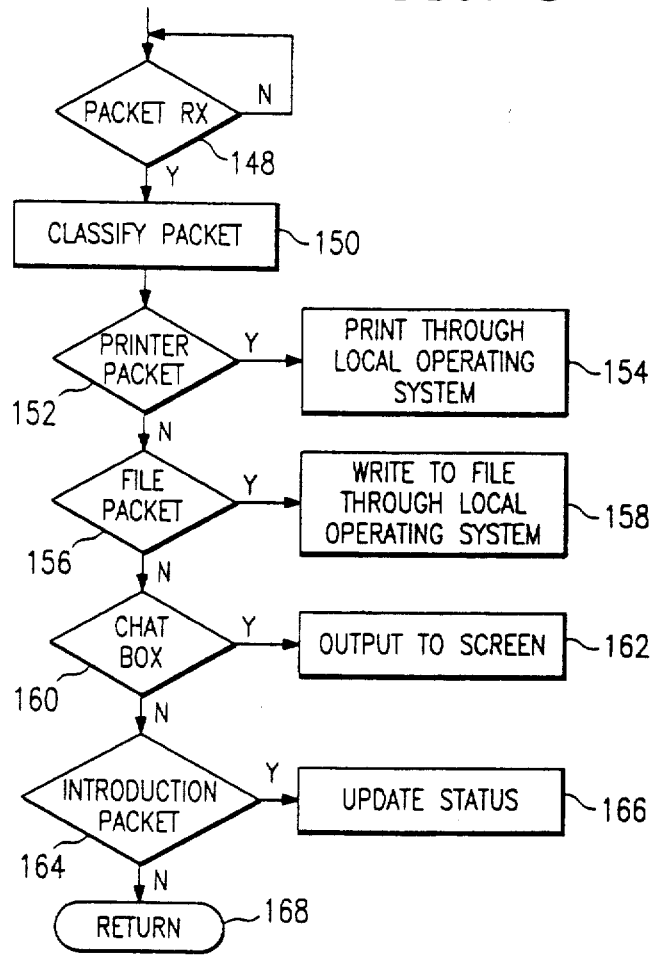
FIG. 8
FIG. 9

VIRTUAL NETWORK FOR PERSONAL COMPUTERS

TECHNICAL FIELD OF THE INVENTION

This invention pertains in general to networks, and more particularly, to a virtual network for use with personal computers.

BACKGROUND OF THE INVENTION

Networking of data processing systems has seen ever increasing use in recent years. Initially, networks involved centralized file servers, memory banks and printer stations which were interconnected through "dumb" terminals. The purpose of these networks was to allow a large number of users to access a common data-base. Additionally, these networks also allow relatively high density memories and a high speed central processing unit to be utilized, which in past years were very expensive. As memory and processing prices have plummeted, this need has gone away.

The price of a personal computer has made it possible for relatively mundane tasks to be accomplished on relatively small machines with localized mass storage, powerful processing capabilities and the ability to support peripheral devices such as modems. This has made it possible to utilize stand-alone systems for such dedicated tasks as word processing, although the total power of a personal computer is not realized in such applications. The price of the hardware has made it possible to adapt the personal computers to such uses.

In the small office environment, the personal computer is typically much less expensive than the peripherals that it supports, such as printers, modems, facsimile cards, etc. Therefore, while it is economical to provide a very powerful personal computer at a given number of stations, it is still not economical to provide the peripherals at each station. Networks provide a much needed support function in this area.

Due to the proliferation of personal computers in the work environment, a need has arisen to interconnect the personal computers for the purposes of sharing peripheral devices to minimize the total number of peripheral devices needed for a group of stand-alone systems, and also to allow transfer of data therebetween in the form of documents, electronic mail and accounting data. Typically, these networks require some type of centralized operating system with a centralized processor. The centralized processor interfaces with the various personal computers on the network through parallel or serial data links, which data links require separate wiring to be provided in an office. Further, these networks require some modification of the personal computer hardware.

In situations where it is only desirable to utilize some of the peripherals on an occasional basis, existing networks tend to be too expensive and the capabilities of these networks are not fully needed. This occurs especially in the case of secretarial use, such as where one personal computer station has a very heavy word processing load and another personal computer station has a relatively light load. Further, one personal computer station may have multiple jobs and only one printer associated therewith. It is therefore desirable to provide a network that would allow access to the peripherals at another station without requiring the expense of modifying the personal computer, utilizing a relatively expensive central processor, or incurring the costs of purchasing and installing a high-speed data link.

SUMMARY OF THE INVENTION

The present invention disclosed and claimed herein comprises a network for interfacing a plurality of personal computers, each of the personal computers disposed at a remote network node. Each of the personal computers includes a central processing unit that is operable to execute application programs and an operating system for allowing the central processing unit to interface with a user and input/output device. A plurality of network devices are defined and disposed at select ones of the network nodes and associated with the personal computer at that associated network node An arbiter is provided having a plurality of node ports, each of the node ports being associated with one of the network nodes. The arbiter is operable to receive network data having destination information associated therewith and transmit the received network data to one of the network nodes associated with the destination information. A data link is provided between the arbiter and each of the network nodes. Interface circuitry is provided in each of the personal computers for interfacing between the associated network node and the associated data link in the arbiter. The interface circuitry includes a memory for storing network status at each of the network nodes for defining at which of the network nodes each of the peripheral devices is disposed. An input/output instruction set is provided that is operated by the central processing unit to define the one of the network peripheral devices that is to be accessed by the application program during operation thereof. This is defined by the network status information. A set of network instructions is executed by the central processing unit in parallel with the application program. The network instructions when processed by the central processing unit cause data that is to be output from the central processing unit running the application program to be converted to network data for routing to the defined network peripheral.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates a flow diagram for the process whereby data packets are received by the network program;

FIG. 8 illustrates a flow diagram for the operation for transmitting data to the arbiter; and FIG. 9 illustrates a flow diagram for the classification procedure of received package data.

DETAILED DESCRIPTION OF THE INVENTION

Figure 1:
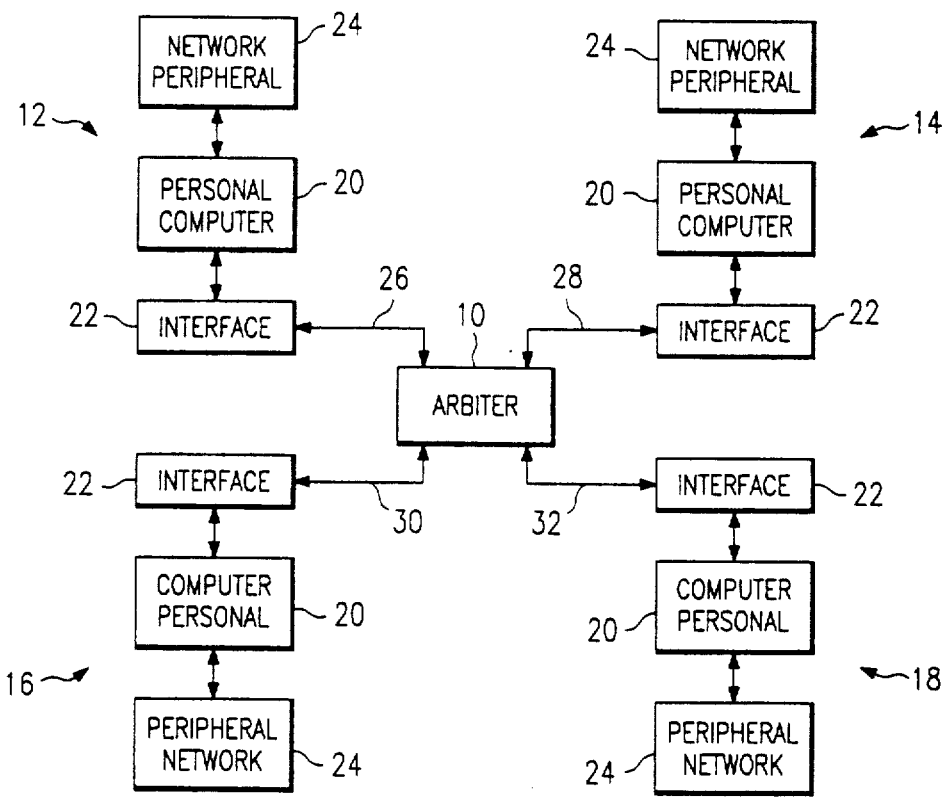
FIG. 1 illustrates a block diagram of the network.

Referring now to FIG. 1, there is illustrated a block diagram of the network of the present invention. The network is comprised of a centrally disposed arbiter 10 which is interconnected to, in the present example, four network stations 12, 14, 16 and 18. Each of the network stations 12-18 are comprised of a personal computer 20, a network interface 22 and a network peripheral 24. The arbiter 10 is interconnected to the interface 22 of network station 12 through a serial data link 26. In a similar manner, arbiter 10 is connected to network stations 14, 16 and 18 through serial data links 28, 30 and 32, respectively.

In the preferred embodiment, the arbiter 10 is operable to route packets of information received on any of the data links 26-32 to any of the data links 26, 32. Each packet that is received is buffered and a unique identification code analyzed to determine which port of the arbiter 10 the packet is to be transferred to. The arbiter 10 does nothing more than route information received on one port to an output on any of the ports of the arbiter 10. The arbiter 10 could, in fact, route the information back out the same port it was received on.

Each of the network stations 12-18 is essentially a stand-alone system with the personal computer 20 having its own memory, its own operating system, and its own application programs. Therefore, the personal computer 20 is operable to execute its application programs at the location of the network station, but input of data to the personal computer for use by the application program and the personal computer 20 can be obtained from anywhere in the network, and data can be output to any network peripheral 24 in the network, as will be described hereinbelow.

Each personal computer 20 has its own operating system, which, in the preferred embodiment, is in part comprised of a disk operating system (DOS). The operating system also includes a Basic Input Output System (BIOS). DOS and BIOS are programs which control every part of the computer system and not only make it possible for other application programs to work, but also provide complete control over what the computer does and how it does it. They are a link between the user and the computer. It essentially is the operating system that manages the hardware and allows the other application programs to interface with the hardware. The operating system is invisible to the user and merely provides the background function of storing and retrieving files on a disc or printing to a printer, etc. Although only one operating system is described, it should be understood that any operating system can be accommodated by the network of the present invention.

In the network of the present invention, each of the personal computers 20 has its own operating system which is independent of the other operating systems in the network, i.e., they are distributed. When information is transferred from one personal computer 20 to another personal computer 20 in the network, it is unimportant for the operating systems of the two computers to interrelate. However, the network of the present invention makes this invisible to the user of the personal computer 20. The network makes each of the network's peripherals 24 appear as if it is attached locally to the personal computer 20 and is controlled by its disk operating system as opposed to being controlled by the disk operating system on another computer.

For example, if the personal computer 20 at network station 12 has a job that needs to be output on the network peripheral 24 at network station 18, status information in personal computer 20 at network station 12 is changed to indicate that the output will go to the network peripheral 24 at network station 18. Once the status information has been changed, the application program and the user operate as if the network peripheral 24 at network station 18 were attached to network station 12; that is, the application program outputs data to an output port that would normally be associated with the personal computer 20 at that network station. The network software which is stored in each of the personal computers 20 at all of the network stations 12-18 intercepts the output data and routes it along the network through arbiter 10.

As a more specific example, consider that the network peripheral 24 at network station 18 is a printer. The personal computer 20 at the network station 12 will run an application program that will have the possibility of outputting printer data to three ports which are designated LPT1, LPT2, and LPT3 in accordance with the internal commands in the operating system. Whenever one of these ports is selected, the network defines which of the network peripherals 24 at the network stations 12-18 are associated with this command. Therefore, if the network peripheral 24 were designated as the LPT1 port for the personal computer 20 at network station 12, any application program which selected the output port as LPT1 would have the output data intercepted and routed through arbiter 10 to personal computer 20. The background network program in the personal computer 20 would then receive this information and output it to the network peripheral 24 associated with the network station 18. However, if the network peripheral 24 associated with the network station 12 were designated as the peripheral associated with the LPT1 output command, the personal computer 20 would route the data to network peripheral 24 in the normal manner, not utilizing the background network program.

As a further example, assume that the network peripheral 24 at network station 12 is designated in the hardware as LPT1. Therefore, any time an application program running in personal computer 20 designates the output port as LPT1 and the status information in the network program at station 12 also designates the network peripheral 24 associated with network station 12 as the LPT1 port, any output data from the application program in personal computer 20 at network station 12 will be routed to the associated network peripheral 24. Assume also, that network peripheral 24 in network station 18 is designated as the LPT2 output. Therefore, any application programs that were running in personal computer 20 at network station 12 that designated LPT2 as the output port would be intercepted by the background network program and routed through the arbiter 10 to the personal computer 20 at the network station 18. Status information in the personal computer 20 at network station 18 recognizes that the information is being routed to the associated network peripheral 24, regardless of which network peripheral 24 it is connected to. If it is assumed that network peripheral 24 of network station 18 is connected to the LPT1 port, the background program interfaces with the operating system of personal computer 20 associated therewith and routes this information to the LPT1 port therein, thus outputting it to the network peripheral 24 at station 18. Therefore, the network program in the personal computer 12 recognizes an application program outputting data to the LPT2 output, intercepts it and routes it to personal computer 20 at network station 18. The network program at network station 18 then receives the data and routes it to the LPT1 output of the associated personal computer 20, thus outputting the data to the associated network peripheral 24.

When setting up the network status on the personal computer 20 at any of the network stations 12-18, a "hot key" is provided. This hot key allows each associated personal computer 20 to define which network peripheral is associated with which of the operating system outputs. As will be described hereinbelow, the hot key is accessible during the operation of any of the application programs. Therefore, the network routing can be defined without exiting the application program and routing does not require any alteration of the application program. The application program operates completely independent of the network.

The hot key, as will be described hereinbelow, allows the user to redirect the output of a particular program without changing the settings in the application program itself. For example, if a particular application program is set up to output to the LPT1 port, the network merely changes the routing of all LPT1 output from the associated personal computer 20. Under normal operation, the LPT1 output on an application program would relate to the network peripheral connected directly from the personal computer to the first parallel port. This is a hardware-defined interconnection and the operating system recognizes the LPT1 command and automatically outputs an LPT1 output to that parallel port. However, when routing to another peripheral in the network that is local, the LPT1 command being output by the application program is recognized and the output data placed in an internal buffer and then routed through the arbiter 10 to another one of the peripherals 24 in the network. The destination of the data is determined at the associated personal computer 20 and then routed to the arbiter 10. It is therefore an important aspect of the present invention that the status information for the entire network be resident in each of the personal computers 20 at each of the network stations 12-18. However, the status information only determines where the peripherals 24 are located in the network, but does not contain routing information for outbound data from another network station.

Figure 2:
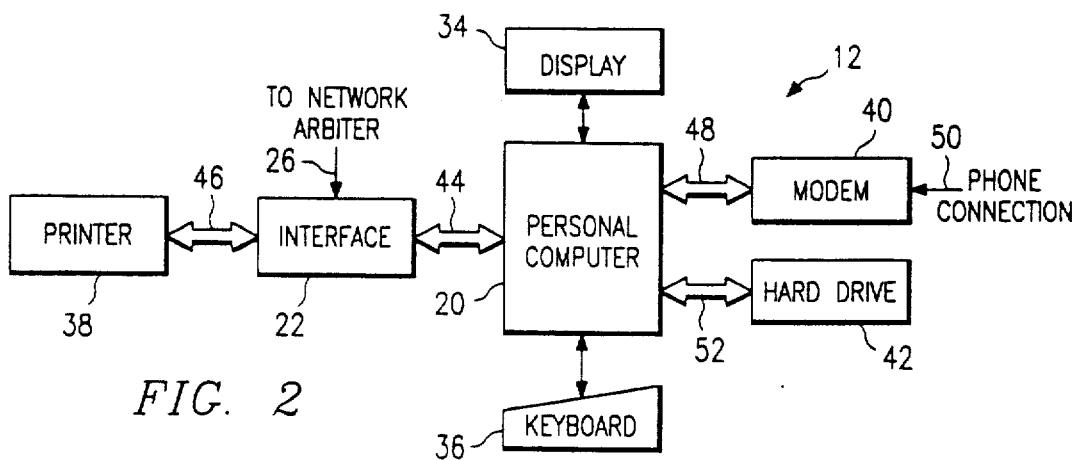
FIG. 2 illustrates a block diagram of one of the network stations.

Referring now to FIG. 2, there is illustrated a detailed block diagram of the network station 12, each of the remaining network stations 14-18 being essentially identical. The personal computer 20 has associated therewith a display 34 and a keyboard 36. The keyboard 36 allows data to be input to the personal computer 20 and the display 34 provides one form of an output. The network peripheral 24 is illustrated in FIG. 2 as being comprised of a printer 38, a modem 40, and a hard-disk drive 42. It should be understood that other types of peripheral devices can be interfaced with the personal computer 20 and be considered a network peripheral device.

The printer 38 is connected through the network interface 22, the network interface 22 being inserted in series with the connection to the printer 38. A parallel bus 44 is provided for interconnecting between the personal computer 20 and the interface 22 and a parallel bus 46 is provided between the network interface 22 and the printer 38. The modem 40 is operable to be interfaced with the personal computer 20 through a parallel bus 48 and also with a standard telephone company line connection 50. The hard-disk drive 42 is interconnected with the personal computer through a parallel bus 52. The hard-disk drive 42 is operable to provide non-volatile storage for the personal computer 20.

In the network station 12, illustrated in FIG. 2, the operating system, the printer 38 and the hard-disk drive 42. In addition, the modem 40 is also controlled by the operating system. Therefore, the network allows the personal computer 20 to directly access the hard-disk drive 42 and the printer 38 through its own operating system or to use the network and the operating system of another personal computer 20 on the network to access the peripheral device thereon.

Figure 3:
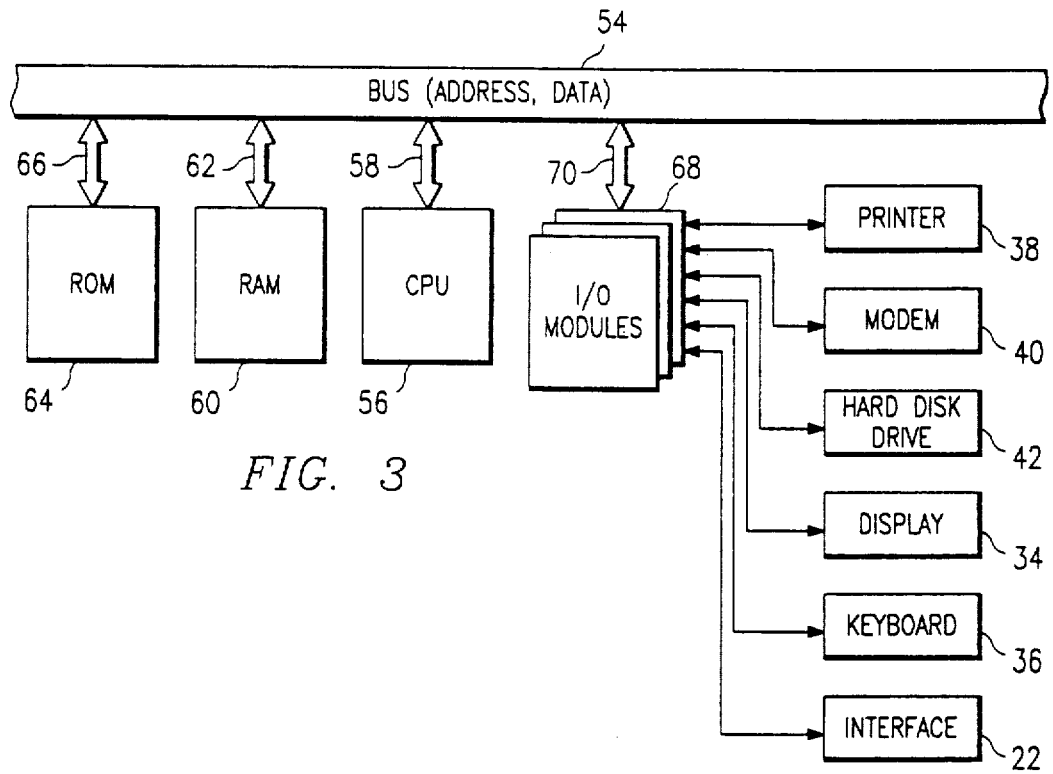
FIG. 3 illustrates a block diagram of the internal modules on the personal computer.

Referring now to FIG. 3, there is illustrated a block diagram of the internal modules for the personal computer 20. In general, data is routed internal to the personal computer 20 through address and data buses, as represented by a single bus 54. The central processing unit (CPU) is illustrated by a block 56 which is interfaced through a bi-directional bus 58 to the address/data bus 54. In addition, volatile memory 60 in the form of random access memory (RAM) is interfaced with the address/data bus through a bi-directional bus 62. In a similar manner, non-volatile memory in the form of read only memory (ROM) 64 is interfaced with the address/data bus 54 through the bus 66. In addition to the CPU 56, the RAM 60 and the ROM 64, a plurality of I/O modules 68 are interfaced with the address/data bus 54 through a bus 70. It is to be understood that the buses 50, 62, 66 and 70 represent both address, data and control lines. The I/O module 68 provides the interface between the address/data bus 54 and the printer 38, modem 40, hard disk drive 42, display 34 and keyboard 36 and any other input/output devices that may be connected to the personal computer 20.

In general, an application program can be loaded from the hard-disk drive 42 into the RAM 60 and then a set of instructions executed in a sequence according to the particular application program. When a particular instruction requires data to be transferred through the I/O modules 68 to either the display 34, the printer 38 or the modem 40 or even the hard-disk drive 42, it is necessary to execute a particular set of instructions to interface with the input/output devices. These instructions are embedded in the operating system which is also stored in the RAM 60 in the form of an executable program.

In order to communicate with the network, it is also necessary to provide an output to the interface 22 and to also receive input from the interface 22. Therefore, the network background program is also stored in RAM 60 and comprises a set of executable instruction steps which are operable to effect communication with the interface 22 in accordance with those instruction steps. Since the interface is an input/output device, the personal computer operating system stored in RAM 60 is utilized to effect this communication. This will be described in more detail hereinbelow.

Figure 4:
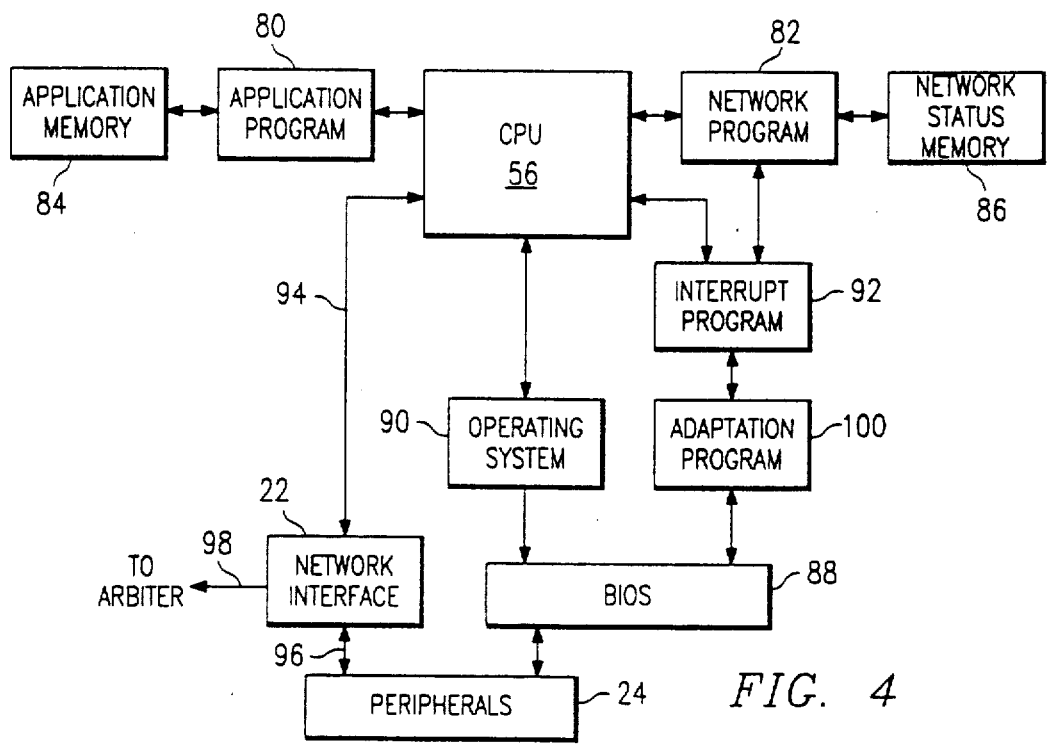
FIG. 4 illustrates a logical diagram of the program interaction in a network station.

Referring now to FIG. 4, there is illustrated a logical block diagram of one of the network stations 12-18. The CPU 56 provides the central processing capability for the network station. Since the network station of FIG. 4 is illustrated in a logical format, the CPU 56 is illustrated as being interfaced with an application program 80 and network program 82. The application program 80 is generally loaded into Random Access Memory (RAM) and comprises a series of executable instructions which are executed in a predetermined order. The portion of the memory in the network station that is associated with the application program is referred to as the application memory 84, which application memory 84 is interfaced with the application program 80. During execution, the application program 80 is run by the CPU 56 and accesses data stored in the application memory 84 as needed. Typically, the application memory 84 is comprised in part of RAM and in part of non-volatile memory, such as that found in the hard-disk drive 42.

The network program 82 interfaces with the network status memory 86. The network status memory 86 is similar to the application memory 84 in that it is comprised partially of RAM and partially of nonvolatile memory in the form of the hard-disk drive 42. The network program 82 utilizes the network status memory 86 to store status information therein. The status information is comprised of two forms of status, local status and network status. The network status informs the network station and the associated network program 82 as to the peripheral units that exist in the network and on which system port they are located. As described above, the arbiter 10 has defined input/output ports associated therewith. Each of these ports has a defined network station associated therewith. By having knowledge of which network port a particular peripheral unit is associated with, a data packet can be generated with this address and sent out to the arbiter 10, as will be described in more detail hereinbelow. Further, this status information also determines the availability of a particular network peripheral, i.e., whether it is already in use.

The second type of status information contained in the network status memory 86 is local routing information. For example, if the LPT1 output port designates a particular peripheral on another network station, this information is contained in the network status memory 86. However, this routing information is not available to other network stations, since this data would be of no use to the other network stations. It is only necessary for the network program 82 at the associated network station, to allow determination of where information is to be output under the control of the CPU 56 and the network program 82.

The network program 82 is a background program which operates on an interactive basis. In general, the program is normally idle when information is not being routed to the network but it continues to operate in an interleaved fashion with the application program 80. This background operation "steals" a number of cycles from the operating cycle of the CPU 56 during which the instruction steps in the network program 82 are executed. When one program is being executed, the other program is halted at the previous execution instruction and then the execution of the one program resumes in the normal sequence. When the network program 82 is active and is required to assemble packets of data and transmit them to the arbiter 10, the percentage of an operating cycle of the CPU 56 that is required for the network program 82 to operate increases.

The CPU 56 operates with a network peripheral 24 through a BIOS 88, the BIOS 88 providing the general input/output interface. Commands can be routed to the operating system 90 which can be a DOS system, it being understood that both the BIOS 88 and the operating system 90 all comprise the overall operating system of the network station. The CPU 56 can also communicate directly with the BIOS 88 to access the peripherals 24, which is the normal operating mode for accessing printers and the such. This access is in the form of standard commands which are output to the BIOS 88 and these are handshakes that are received back from the BIOS 88. These handshakes are in the form of commands such as Printer Ready, etc.

An interrupt program 92, which is an integral part of the network program 82, is operable to an interface between the CPU 56 and the BIOS 88 and functions to determine whether a particular instruction is to be intercepted by the network program 82. As an example, assume that network status memory 86 had the routing information therein set such that the LPT1 output is designated as being on another network station. Assume further that the application program 80 during its execution outputs data to the LPT1 output. The interrupt program 92 would recognize this situation and would send this information to the network program 82 which would then begin to retrieve and assemble the data into packets. These packets of data are then transferred by the CPU 56 to the network interface 22 on a line 94. The line 94 comprises select ones of the input/output lines between the CPU 56 and the associated peripherals 24. The network interface 22 is inserted such that the output of the network interface 22 passes these lines through the peripherals 24 via line 96 and also interfaces with the arbiter 10 through a line 98, line 98 corresponding to the lines 26-32 of FIG. 1.

In operation, it is only necessary for the network program 82 to assemble the packets of data and, through the CPU 56, transfer the data to an input/output port. Although the network interface 22 of the present invention is illustrated as being in series with already existing input/output lines, a separate input/output port could be defined as a dedicated port. However, one aspect of the present invention is that the network interface 22 can be incorporated external to the personal computer 20 without requiring a dedicated port or the circuitry to interface with the CPU 56.

When data designated for a local peripheral is intercepted by the interrupt program 92, it is necessary for the application program 82 to receive handshake information from the BIOS 88 indicating that data has been transferred to the LPT1 port. Assume, by way of example, that the information is to be output to a printer, with no printer being associated with the local network station. The application program 80 would expect to receive a Printer Ready signal back from the BIOS 88. To account for this, an adaptation program 100 is provided that operates in conjunction with the interrupt program 92 and the BIOS 88. The adaptation program 100 generates signals such that the application program 80 receives the appropriate handshake, even though the handshake was not directly generated by the BIOS 88. In this manner, no modification need be made to the application program 80 or to the operating software in order to effect network transfer.

Figure 5:
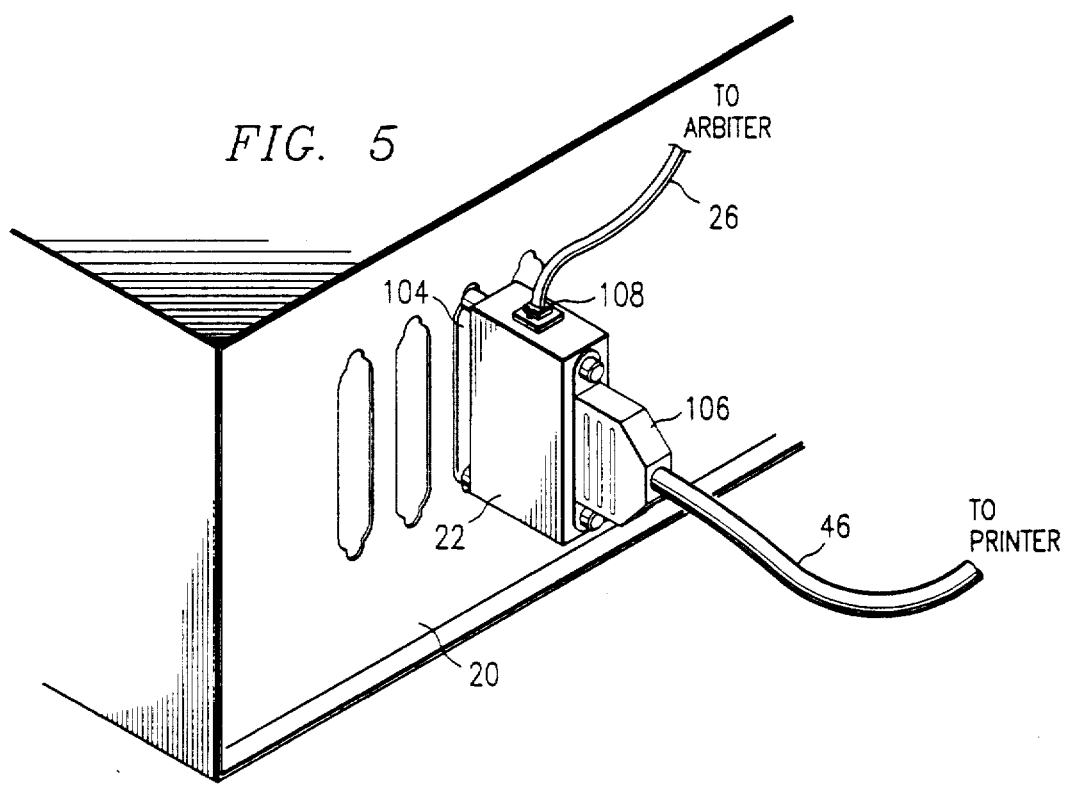
FIG. 5 illustrates a perspective view of the network interface inserted in series with the parallel printer port of the personal computer.

Referring now to FIG. 5, there is illustrated a perspective view of the network interface 22, as utilized in the preferred embodiment. The interface 22 is comprised of a housing which is operable at one end to be connected to a parallel printer port 104 on the back of the personal computer 20. The parallel printer port 104 is the port to which the printer 38 is normally connected through the cable 46. At the end of the cable 46 is disposed a port connector 106 that interfaces with the other end of the housing 22. Housing 22 is designed such that it receives the line 26 in the form of a four wire telephone jack 108. Therefore, the line 26 that interfaces between the network interface 22 and the arbiter 10 is comprised of a four wire conductor. By utilizing the telephone jack 108, conventional wiring can be utilized in an office environment. No special cabling is required other than the running of the conventional telephone wire. This is relatively inexpensive and can be easily facilitated in either an initial build out of an office or in a rewiring scheme.

Figure 6:
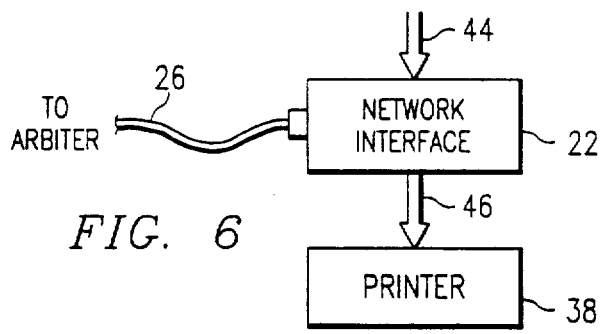
FIGS. 6 and 6A illustrate a more detailed view of the network interface.

Referring now to FIG. 6, there is illustrated a block diagram of the network interface 22 at its interconnection with the printer 38. The network interface 22, although illustrated in FIG. 5 as being directly connected to the parallel port, can be connected anywhere along the printer cable 46. The internal wiring for the network interface 22 allows the line 44 and the data transferred thereon to be connected to the data link 26. The specific interface is illustrated in FIG. 6a.

Figure 6A:
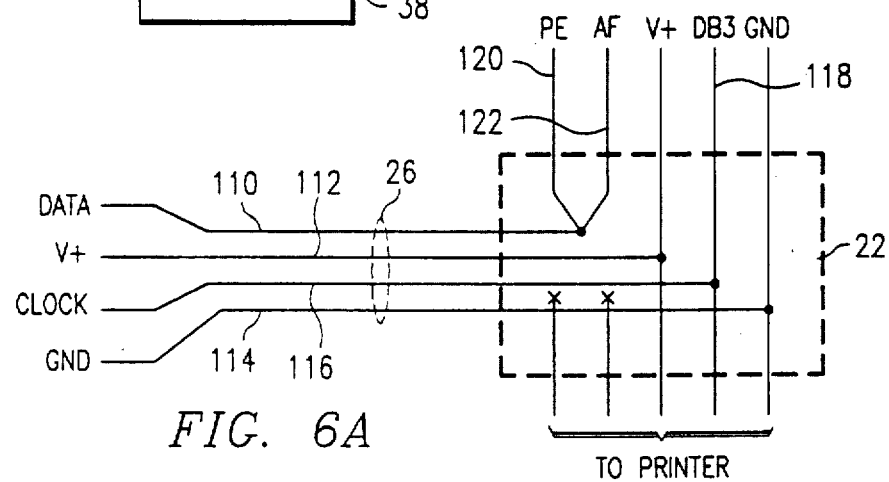

In FIG. 6a, select ones of the parallel lines on the port 104 are routed to the data link 26, which is described above as a four wire data link. The four wires comprise a data line 110, a supply line 112, a clock line 114 and a ground line 116. The ground line 116 is connected to the ground line from the personal computer 20 and the associated port 104. However, the clock line 114 and positive supply line 119 are connected to two of the data lines, a line 118 which constitutes the DB3 data line and a line which constitutes the DB2 data line. The data line 110 is connected to two lines, a line 120 and a line 122, which are detached from the output of interface 22 such that they do not pass through to the printer 38. The two lines 120 and 122 comprise the Paper Empty (PE) line and the Auto-Feed (AF) line respectively. The PE line 120 is a receive input and the AF line 122 is a transmit output. Therefore, the data line 110 comprises a bidirectional data line. Although the PE line 120 and the AF line 122 are disconnected from the printer 38, they are generally utilized by the printer and are available. However, if the printer 38 does need the use of these lines, they will not be available with the configuration of FIG. 6a.

The network program 80 in conjunction with the interrupt program 92 and the adaptation program 100 revolve around an array of tasks, or processes, the method of communication between a processes and the method of executing the various processes. All communications between processes are performed in units called packets. Packets are built of smaller units called messages, the smallest unit of data transferrable over the communications channel. In the preferred embodiment, a message consists of eight bytes. Each packet consists of a packet header message followed by the actual data. The first three bytes of each packet header are defined as the Packet Type byte, the Source/Destination byte, and the Packet Length byte. The other five bytes of the packet header message vary depending on the type of process that sent the packet.

Communications are performed by two background tasks, a Write Next Message and a Read Next Message. The Write Next Message task is responsible for finding the next message to be sent over the communications channel. The Read Next Message task is responsible for taking messages from the communications channel and placing them in the correct process buffers. These tasks are performed independently of the data in the packets.

When an output process is created on one of the personal computers 20 and generates a packet to be transferred, it sets the Packet Type byte in the packet header message to a value depending on the type of process that sent the packet. When the packet header is received at the destination computer, the Packet Type and Source/Destination bytes are checked to determine if the destination process for this packet exists. If not, a destination process for the packet is created and the appropriate function pointers for the process are set to handle the appropriate buffer conditions. After the first message has been transferred and the destination process has been created, the sending computer sends the next message of data to the destination process which was created when the packet header message was received, as will be described hereinbelow. When the last message of the packet is read in, a buffer full flag for the process that received the packet is set.

If the Write Next Message task is not currently writing a packet, it looks in a round-robin fashion for processes with packets to be sent. Processes with packets to be sent are identified by the type of process and certain combinations of bits in a flag field in the process. Output processes or input processes with the flag set to a full condition are processes with data to be sent over the communications channel. When flags corresponding to a write and a Ready-to-Send condition are set, the Write Next Message task will begin sending the packet. After the packet header message is written to the communications channel, these bits are cleared to indicate that the buffer is no longer full. When the last message of the packet is written, the appropriate Empty bit will be set in the flags field.

The Read Next Message task is responsible for reading in the messages off of the communications channel and building the packets in the destination processes' buffers. The packet is placed in the input buffer of the process indicated in the low order nibble of the Source/Destination byte in the packet header message. The Packet Length byte is used to determine the number of messages in the packet.

The network program 82 continuously looks for processes that need some sort of action to be performed. When the proper bits are set in the packet, certain routines must be performed. For example, in an output process, this function would generate more data to be sent. A secondary function, indicated by a different bit, would indicate that data has been received and this process must perform some action to interpret that data. For an input process, the primary condition would signal that data had been received and the process must remove it from the buffer so that more data may be received. A secondary function in an input process indicates that the data has been transmitted to the output process on another personal computer 20 corresponding to this process.

Each process has a Type field, the value of which indicates either inactive, input or output. Inactive processes are ignored by the network program 82. The type of process determines where data will be placed when transferred over the communication channels. For input processes, read data will be placed in a primary buffer and data sent from this process will be sent from a secondary buffer. For output processes, data will be sent from a primary buffer. Data address to an output process will be placed in the secondary buffer. Data is passed between complimentary pairs of processes. The only destination for an output process is an input process.

The pair of processes running and the associated functions to support those processes can be divided into process types. There are five process types in the preferred embodiment: Introduction, Chat, Printer connection, File transfer, and Modem sharing. The network program allows multiple instances of the same process type to be executing on the same computer at the same time. That is, there can be several output introduction processes executing on the same computer at the same time.

The primary buffer size sets the upper limit on the amount of data that can be passed between processes at one time before the next process with waiting data has control of the communication channel. The normal flow of data between processes is from the primary buffer of an output process to the primary buffer of an input process. The secondary buffer allows bidirectional flow of data between processes. Data will be transferred from the secondary buffer of an input process to the secondary buffer of an output process. This feature allows status information to be returned to an output process. The information that can be returned to an output process. In the preferred embodiment this secondary buffer size is set to eight bytes.

Referring now to FIG. 7, there is illustrated a flow diagram for the process whereby data packets are received by the network program 82. In the program flow, the first block is a decision block 124 which determines whether data has been received. If it has not been received, the program flows along the "N" path back to the input of the decision block 124. In this mode, the network program is idle and is merely looking for data. When data is received, the program flows along the "Y" path to a function block 126 wherein the message is read, which message is eight bytes long.

The program then flows to a function block 128 wherein the message is placed in a buffer. The program then flows to function block 130 wherein the buffered sixteen messages long. These messages, although in a single packet, can be from different sources. For example, there may be two printers at a particular network station which are being accessed. The network of the present invention allows both printers to be accessed simultaneously with information assembled in the packet being routed at a later time to the respective printers.

After the packet has been assembled, the packet is placed in a packet buffer, as indicated by function block 132. The program then flows to decision block 134 to determine if all data has been received. If not, the program flows back to the input to the decision block 124 to assemble another packet and place it in the packet buffer. Once complete, the program flows from the decision 134 along a "Y" path to a return block 136.

Referring now to FIG. 8, there is illustrated a flow diagram for the operation for transmitting data to the arbiter 10. The program is initiated at the input of a decision block 138, where it is determined whether data is to be transmitted. When no data is ready to be transmitted, the program flows along "N" path back to the input of the decision block 138. In this mode, the process is idle and continues to look for either receive data to be transmitted. When data is to be transmitted, the program flows along the "Y" path to a function block 140 wherein the messages are put in a queue. The messages are then transmitted from the queue in accordance with the order in which they were placed in the queue, as indicated by function block 142. The program then flows to a decision block 144 to determine if all the messages have been transmitted. If not, the program flows along the "N" path back to the input of the decision block 138. Once all the messages have been transmitted, the program flows along the "Y" path to a return block 146.

Referring now to FIG. 9, there is illustrated a flow diagram for the classification procedure of received packets of data. Once packets have been received and placed in the packet buffer, the program flows to a decision block 148 to determine if packets are present in the packet buffer, if not the program flows along an "N" path back to the input of the decision block 148. When packets are in the buffer, the program flows along the "Y" path to a function block 150 wherein packets are classified in various classes. In the present embodiment the packets are either designated for a printer, a file, modem, a "chat" mode and/or for an "introduction" mode.

The program flows from the function block 152 to a decision block 152 to determine if the packet is a printer packet. If so, the program flows along the "Y" path to a function block 154 indicating the operation wherein the packet is processed through the local operating system for a print operation. If it is not a printer packet, the program flows along the "N" path to the input of a decision block 156 to determine if the packet is a file packet. If the packet is a file packet, the program flows along the "Y" path to a function block 158 wherein the file is written to the appropriate location via the local operating system.

If the packet is not a file packet, the program flows along the "N" path from the decision block 156 to the input of a decision block 160 to determine the if the program operates in the "Chat" mode. In the "Chat" mode, the operator of one computer can access the display in another computer while operating in the application program. However, once the network has been placed in the "Chat" mode, the operation of the application program at either the receiving or transmitting network station is interrupted and a gateway opened between the two network stations. Therefore, when the packet is being designated for the "Chat" mode, the program flows along the "N" path from the decision block 160 to the input of a decision block 164 to determine if the packet is an Introduction packet.

An Introduction packet is the method by which status information is maintained on the network. In the preferred embodiment, periodic updates are provided by the network program 82 operating in the background to determine if a particular network station is still on the network and if the peripherals for that network are still designated as network peripherals. Initially, when a network station comes on-line it updates the status in the network status memory 86 by sending Introduction packets to each of the ports on the arbiter 10. This Introduction packet identifies the port on the arbiter to which the network station is interfaced and also the peripherals that are associated therewith. These peripherals now become network peripherals in the network status memory 86 of each of the network stations 12-16. This is indicated by function block 166 connected to the "Y" path of the decision block 164. If the packet is not an Introduction packet, the program flows to a return block 168.

The arbiter 10 is manufactured by Dallas Semiconductor, Part no. DS9050 which is comprised of a four way junction circuit, Part no. DS9030, and a port adapter, DS1256. The port adapter was described with reference to FIG. 5 and reference numeral 22. The four way junction box DS9030 utilizes a Quad-port Serial RAM, Part no. DS2015, manufactured by Dallas Semiconductor. The Quad-port Serial RAM provides an arbitration function which is handled by protocol and a message center which forces discipline and prevents collisions. Each port has access to all other ports for reading information and can write information only in its own memory area. The memory space for each port is 64 bits. Access to and from each port takes place over a three wire serial bus. The serial bus keeps the pin count low while providing sufficient bandwidth to accommodate communication. Each port also provides a message flag which can be utilized to warn of message ready conditions. The operation of the Quad-port Serial RAM is described in a preliminary data sheet for the DS2015, pages 92-102, which is incorporated herein by reference.

The introduction processes as described above provide a means of passing status information between the various personal computers 20 on the network. The flow of events is illustrated in Table 1 between the two computers.

TABLE 1
INTRODUCTION PROCESS

| Computer 1: | Computer 2: |
|---|---|
| Create Introduction output and Introduction packet. Send packet. | |
| | Read packet and create input process. |
| Change process type to input. | |
| | Build reply packet. Change process type to output. Send ACK. |
| Receive ACK. Send ACK. | |
| | Receive ACK. Send reply data packet. |
| Receive data packet. Kill process. | Kill process. |

In the introduction process, the introduction output process is created in addition to the Introduction packet. This packet is sent from computer 1 to computer 2 wherein it is read. Computer 1 then changes the process type to an input process. A reply packet is built by computer 2 and an acknowledgement sent back to computer 1 from computer 2. The process type of computer 2 is then changed to an output process prior to sending the acknowledgement packet. Computer 1, which has the process type set to an input process, receives the acknowledgement and then sends back an acknowledgement. Computer 2 receives the acknowledgement and then sends the reply data packet which is received by computer 1.

The "Chat" mode allows "Chat" connection between two computers which take up two processes. One pair of processes is utilized for each direction of data, allowing maximum throughput. The flow of events is illustrated in Table 2.

TABLE 2
CHAT MODE

| Computer 1: | Computer 2: |
|---|---|
| Create Chat output process and Begin Chat packet. Send packet. | |
| | Read packet and create input process. If an error occurs return data packet explaining why and kill process. Create Continue Chat output process and packet. Send packet. |
| Receive packet. Send ACK. | |
| | Receive ACK. Open Chat Window. Send ACK. |
| Receive ACK. Open Chat Window. (Each user enters chat information. Each line typed is sent out the appropriate output process. The input process displays to the screen until one user presses the ≦Esc≧ key. Assume it is user 1). Send data packet with the first byte PR-END-CHAT. Close Chat Window. Kill process. | |
| | Receive Data packet. Close Chat Window. Display "Chat connection closed by _____". Kill process. |

In the "Chat" mode, the first computer creates the "Chat" output process and then begins to accumulate the "Chat" packet. The packet is sent and read by computer 2 which then creates an input process. Computer 2 creates a continued "Chat" output process and packet, and then sends a packet back to computer 1. The packet is received by computer 1 and acknowledgement sent to computer 2 which then opens a "Chat" window. An acknowledge is then sent from computer 2 to computer 1 and computer 1 then opens a "Chat" window. The data packet is then sent from computer 1 to computer 2 and then the "Chat" window closed, this data packet received by computer 2.

When accessing a printer, a printer output process must be implemented. This allows the network station to share printers over the network. The flow of events in the printer output process is illustrated in Table 3.

TABLE 3
PRINTER OUTPUT PROCESS

| Computer 1: | Computer 2: |
|---|---|
| User generates 1st character of output and connection not established. Create Printer output process and Request Printer packet. Send packet. (Waits for ACK) | |
| | Read packet and create input process. If error, return data packet explaining why and kill process. Send ACK. |
| Receive ACK. Buffers up data. (User 1 buffers up data. When LPT_BUFF_SIZE (128) reached send packet and set spooling available flag to FALSE (0). On next character wait for acknowledge or time out). Send data packet with | |

TABLE 3-continued

PRINTER OUTPUT PROCESS

| Computer 1: | Computer 2: |
| --- | --- |
| printer data. | |
| | Receive printer data packet. |
| | Print out data to |
| printer. | |
| | Send ACK when done. |
| Receive ACK. | |
| Set spooling available flag to TRUE(1). | |
| (When "Release After" time elapsed). | |
| Send data packet with LPT_CLOSE. | |
| Kill process. | |
| Set connection established to FALSE. | |
| Display "Connection Closed". | |
| | Receive packet. |
| | Print data to printer |
| | Kill process. |
| | Set printer status to idle. |

In the printer process, the first user generally creates the printer output process and also creates a Request Printer packet. This packet is sent and then computer 1 waits for an acknowledgement. This packet is read by computer 2 and then an acknowledgement signal sent back to computer 1. Upon receipt of the acknowledgement signal, computer 1 buffers up data. This data packet is sent with printer data which is received by computer 2 and data sent out to the printer associated therewith, this operation occurring in the background of the application program, as described above. Acknowledgement is then sent back to computer 1, which, upon receipt results in a data packet being sent to close the printer output process. A data packet indicating the close operation is sent to computer 2 which then kills its input process and sends the remaining data out to the printer. During this process, computer 2 sets its printer status to busy, after which it sets its status to idle. When it is desirable to transfer files between two network stations, it is necessary to view the directory or library of files in a remote network station. It is therefore necessary to transfer the directory between the two network stations. This is referred to as a directory output process. The flow of events for this process is illustrated in Table 4.

TABLE 4

DIRECTORY TRANSFER

| Computer 1: | Computer 2: |
| --- | --- |
| Create Get Directory output process and Get Directory packet. | |
| Send packet. | |
| | Read packet and create input process. |
| Change process type to input. | |
| | Build directory packet. |
| | Change process type to output. |
| | Send ACK. |
| Receive ACK. | |
| Send ACK. | |
| (The computer with the directory repeats the following step, building the directory listing and sending to the requesting computer). | |
| | Receive ACK. |
| | Send directory data |
| packet. | |

TABLE 4-continued

DIRECTORY TRANSFER

| Computer 1: | Computer 2: |
| --- | --- |
| Receive data packet. | |
| Send ACK. | |
| (When the lat entry has been sent). | |
| Kill process. | |
| | Receive ACK. |
| | Kill process. |

In the directory output process, computer 1 first creates a Get Directory output process and then creates a Get Directory packet. This packet is sent to computer 2 which, upon reading the packet, creates an input process. The directory packet is built up in computer 2 and then the process type therein changed to an output process. Acknowledgements are sent between computer 1 and computer 2 to determine if computer 1 is ready to receive the directory. Upon proper transfer of acknowledgement signals, the directory packet is sent to computer 1. After receipt of the directory data packet, the acknowledgement is sent back to computer 2 and the process killed.

After the directories have been received, it is desirable to transfer a file from computer 1 to computer 2. This is referred to as the Put File process. The flow of events is illustrated in Table 5.

TABLE 5

PUT FILE PROCESS

| Computer 1: | Computer 1: |
| --- | --- |
| Create Put File output process and Put File packet. | |
| Send packet. | |
| | Read packet and create input process. |
| | Open file. Send ACK if OK or NACK if error occurred. |
| Receive ACK/NACK. | |
| | If last part of file, close the file. |
| | If closed ok. Send ACK else send NACK. |
| | Kill process. |
| Receive ACK/NACK. | |
| Kill process. | |

In the Put File output process, the output process is created and then a Put File packet is also created. This packet is sent to computer 2 which reads the packet and then opens a file. An acknowledgement is sent from computer 2 to computer 1 indicating the open file and then the file block is read in computer 1 and packets assembled and transferred to computer 2. These packets are read by computer 2 and written to disk and then an acknowledgement sent to computer 1 if the file has written OK. This is received by computer 1 whereby computer 1 continues to assemble and transfer parts of the file. Another acknowledgement sent by computer 2 if the last part of the file was received. This acknowledgement is received by computer 1 and then the processes terminated.

Where a file is transferred from computer 2 to computer 1 under the control of computer 2, the Get File process is executed. The flow of events is illustrated in Table 6.

TABLE 6
GET FILE PROCESS

| Computer 1: | Computer 2: |
|---|---|
| Create Get File output process and Get File packet. Send packet. | |
| | Read packet and create input process. |
| Change process type to input. | |
| | Build reply packet. Change process type to output. Open file. Send ACK if OK or Nack of error occurred. |
| Receive ACK/NACK Send ACK if ok. | |
| | Receive ACK. |
| (The following is repeated until the file is completely transferred). | |
| | Read file from disk. Send file data packet. |
| Receive file data packet. Write file packet to disk. Send ACK if written ok. Send NACK if error. | |
| | Receive ACK/NACK |
| If last part of file, close the file. Kill process. | |
| | Close file. Kill process. |

Whenever a file is transferred from computer 2 to computer 1, the Get File process is created on computer 1 in addition to a Get File packet. This packet is sent to computer 2 which reads the packet and then creates an input process. Computer 1 changes its process type to an input process and then awaits a reply packet. This reply packet is built up in computer 2, the process type on computer 2 changed to an output process and then a file opened. Acknowledgements are exchanged by the two computers to determine when computer 1 is ready to receive the file and then computer 2 reads the file from disk, assembles it into a data packet and forwards the data packet to computer 1. Computer 1 receives the data packet and writes it to disk and then sends an acknowledgement to computer 2. Computer 2 continues to read and send packets of parts of the file. When the last part of the file has been received by Computer 1 the file is closed and sends an acknowledgement to Computer 2, which upon receipt thereof, closes the file and terminates the process.

Whenever it is desirable to change routing information in the network status memory, an update can be accomplished at any point in the execution of the application program by depressing a "hot key." Typically, this is a predefined key or keys such as the Control and Shift keys on a standard keyboard. Once depressed, this interrupts the application program and opens a "window" into the network program to either redefine the routing information or to open a "chat" window to another computer.

In summary, there has been provided a network that is distributed about an arbitration circuit. The arbitration circuit is operable to allow simultaneous communication between all of the ports in the network by transferring data in packets. Each of the network stations has a personal computer associated therewith that is self contained and has its own operating system. Peripheral devices on each of the network stations are designated as network peripherals and the status of each of the network peripherals is stored at each of the network stations, such that each of the network stations is aware of the port locations on the network of each of the peripherals. The peripherals are accessed in the background of an application program running on the computer at the particular network station.

Although the preferred embodiment has been described in detail, it should be understood that various changes, substitutions and alterations can be made therein without departing from the spirit and scope of the invention as defined by the appended claims.

What is claimed is:

1. A network for interfacing a plurality of personal computers, each disposed on a separate network node, each of the personal computers having a central processing unit operable to execute application programs and an operating system for allowing the central processing unit to interface with a use and input/output devices, the network comprising:

a plurality of network peripheral devices each disposed at one of the network nodes and associated with a personal computer at that node;

an arbiter having a plurality of node ports, each node port associated with one of the network nodes, said arbiter operable to asynchronously receive network data having destination information associated therewith defining the network peripheral device and associated network node to which the received network data is to be transmitted to, and said arbiter asynchronously transmitting the received network data to the one of the network nodes associated with the destination information;

a data link disposed between each of said network nodes and said associated node port on said arbiter;

interface means associated with each of the network nodes for interfacing between each of the network nodes, said associated data link and said arbiter, said interface means including:

a network status storage medium for storing status information for the network defining at which of the network nodes each of said peripheral devices is disposed, an input/output instruction set for being executed by the associated central processing unit and defining the one of the network peripheral devices that is to be accessed by the application program during the operation thereof, said network peripheral devices defined in accordance with information stored in said network status storage medium, a set of network instructions for being executed by the associated central processing unit in parallel with the application program, the network instructions when executed by the associated central processing unit causing output data from the associated central processing unit running the application program to be converted to network data for routing to the defined one of said network peripheral devices through said arbiter when the defined one of said network peripheral devices is not local to the associated network node, and for causing network data received from said arbiter through said associated data link to be routed to the associated one of the network peripheral devices, and a connecting device for allowing the associated central processing unit to transfer network data to said associated data link and receive network data from said associated data link.

2. The network of claim 1 wherein said connecting device and said data link comprise:
a serial data line for carrying serial data;
a clock line for carrying clock information to said arbiter, said arbiter utilizing said clock information to clock data into a buffer, each of the network ports having a buffer associated therewith for storing data received from said serial data line; and
power supply lines for carrying power supply voltages to said arbiter for powering said arbiter, said arbiter requiring an external power supply.

3. The network of claim 2 wherein each of the personal computers includes a parallel output port for interfacing with one of the associated peripheral devices in a parallel line, and said connecting device includes:
an adapter for being inserted between said parallel port and said associated peripheral device and in series with said parallel line;
said adapter interfacing select ones of the individual lines in the parallel port to said data line, said clock line and said power supply lines wherein the associated central processing unit accesses said serial data line, said clock line and said power supply line in accordance with said set of network instructions.

4. The network of claim 3 wherein said data line is interfaced with peripheral control lines output by the associated one of the personal computers wherein the associated central processing unit accesses the peripheral control lines to the peripheral device to output data and receive data from said arbiter.

5. The method of claim 1 wherein said network status storage medium further comprises means for updating the information stored in said network status storage medium.

6. The network of claim 5 wherein said interface means further includes means for sending network data to each of the network nodes to request status information therefrom and for receiving the request of status information, said interface means also includes means for receiving a status request and forwarding status information to the network.

7. The network of claim 1 wherein said arbiter includes a buffer associated with each of said node ports, said buffer operable to receive and store information therein, wherein the data transfer is not in real time.

8. The arbiter of claim 1 wherein said data link transfers network data in a serial format and said arbiter is operable to transmit information in packets of serial data, each packet comprising portions of a data transaction from one of the network nodes to another of the network nodes.

9. The network of claim 1 wherein said arbiter is operable to route network data from one of the network nodes to another of the network nodes at the same time it is routing data to the one of the network nodes.

10. The network of claim 1 wherein one of the network nodes can have at least two network peripheral devices associated therewith and said arbiter is operable to route information to both of the network peripheral devices on the one network node at the same time.

11. A method for networking personal computers, comprising:
providing a plurality of personal computers, each of the personal computers disposed at a remote network node and having a unique identification code associated therewith, each PC having a central processing unit for executing sets of instructions in an application program, and an operating system for interfacing the central processing unit with a user and peripheral devices that are disposed local to the network nodes;
disposing a plurality of network peripheral devices at select ones of the network nodes;
storing network status information at each of the network nodes, the status information comprising a unique identification code of each of the network nodes, the location of each of the peripheral devices in the network and network routing information;
accessing a select one of the network peripheral devices for transfer of network data thereto by a step of transferring network data between two of the network nodes only when the select one of the network peripheral devices is not disposed at the network node from which network data is to be transferred from;
accessing a selected one of the network peripheral devices through the operating system of the personal computer at the associated network node when the select one of the peripheral devices is disposed at the associated network node, the step of transferring network data comprising:
determining from the network status information at the transferring network node from which network data is to be transferred if the selected peripheral device is disposed at a different network node;
providing a communication link between all of the network nodes such that data can be simultaneously transferred between all of the network nodes, the step of providing a communication link including:
providing a centrally disposed arbiter having a plurality of network ports,
providing a single data link from each of the network ports in the arbiter to each of the personal computers,
interfacing with the associated communication link between the arbiter and the personal computer when network data is to be transferred from the network node, and asynchronously transferring and buffering the network data to be transferred at the arbiter,
determining from the routing information associated with the received and buffered data which of the network ports the received and buffered network data is to be transferred to as a destination network port and transferring the received and buffered network data to the destination network port, and
asynchronously receiving at the network node the buffered network data from the arbiter on the associated communication link when data is to be received by the network node;
assembling data from the central processing unit at the transferring network node as network data when it is determined that the peripheral device to which data is to be sent is not local in accordance with the network status and routing information, and transmitting the network data to the communication link, the network data including associated routing information,
receiving the network data from the communication link at the one of the network nodes designated as a receiving network node by the network data, and outputting the received network data to the designated peripheral device at the receiving one of the network nodes, the step of assembling and transferring network data operating in parallel with the processing in the central processing unit at the associated network node.

* * * * *